Dec. 19, 1922. 1,439,044.
F. C. WHITE.
MOTOR SUSPENSION FOR PLAYER PIANOS.
FILED MAY 7, 1921.
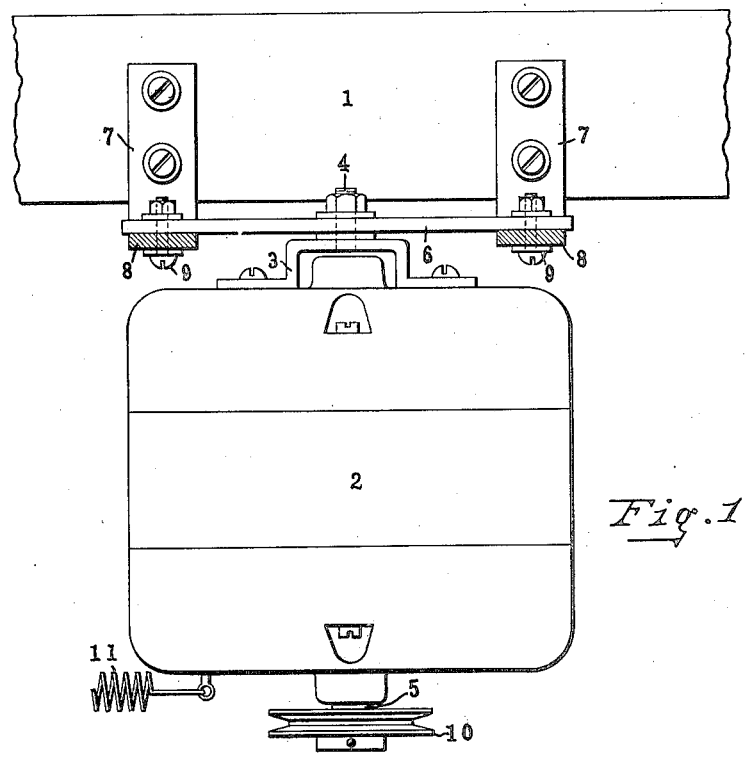
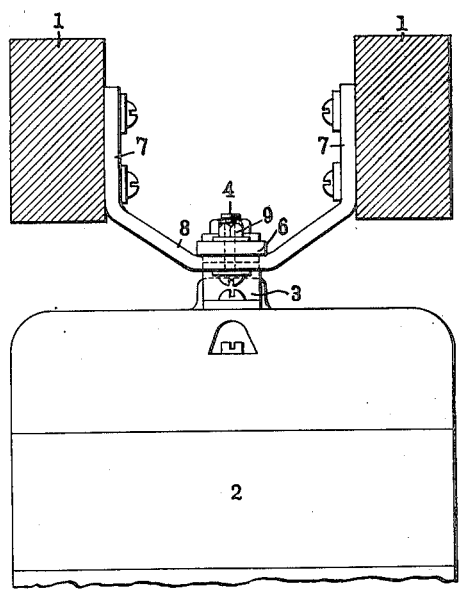
INVENTOR
Frank C. White
BY
Duell, Warfield & Duell
ATTORNEY Patented Dec. 19, 1922.

1,439,044

UNITED STATES PATENT OFFICE.

FRANK C. WHITE, OF MERIDEN, CONNECTICUT, ASSIGNOR, BY MESNE ASSIGNMENTS, TO EARLE E. CONWAY, OF BOSTON, MASSACHUSETTS, CARLE C. CONWAY, OF NEW YORK, N. Y., AND THEODORE P. BROWN, OF WORCESTER, MASSACHUSETTS, TRUSTEES.

MOTOR SUSPENSION FOR PLAYER PIANOS.

Application filed May 7, 1921. Serial No. 467,615.

*To all whom it may concern:*

Be it known that I, FRANK C. WHITE, a citizen of the United States, residing at Meriden, in the county of New Haven and State of Connecticut, have invented certain new and useful Improvements in Motor Suspensions for Player Pianos, of which the following is a full, clear, and exact description, such as will enable others skilled in the art to which it appertains to make and use the same.

This invention relates to motor suspension and more particularly in some of its details to a flexible suspension device for electric motors designed especially for use in connection with player pianos.

In player pianos wherein the pneumatic playing mechanism, is actuated from a suction apparatus driven by an electric motor, considerable objection has been encountered on account of the humming and other noises incident to the vibration of the motor. In known types of motor suspension employed for the purpose mentioned, the vibrations of the motor are frequently transmitted through the suspension to the piano frame, the latter acting as a sounding board augmenting the humming and amplifying the other objectionable noises.

It is therefore an object of the invention to provide an improved motor suspension having sound deadening features particularly designed and adapted to absorb the vibration of the driving motor, thus preventing objectionable noises.

Another object is to provide an improved motor suspension of the class mentioned which is simple, inexpensive in construction, easily applied and efficient and durable in use.

Still further objects will be pointed out in connection with the following detailed description, and additional objects will be obvious as the detailed description proceeds.

The invention accordingly consists in the features of construction, combinations of elements and arrangement of parts which will be exemplified in the construction hereinafter set forth, and the scope of the application of which will be indicated in the following claims.

In the accompanying drawings wherein an illustrative but preferred embodiment of the invention is shown, Figure 1 is a fragmentary cross sectional view showing an electric motor suspended in accordance with this invention;

Fig. 2 is a cross sectional view at right angles to the view of Figure 1.

Referring to the drawing, supporting stringers 1 are shown which may be members of the piano frame, or they may be inserted particularly for the purpose of supporting the motor shown at 2. These stringers are spaced apart a short distance extending parallel to each other and the improved suspending means is attached thereto supporting the driving motor 2 in pendant position.

This suspending means comprises a bracket or yoke 3 secured in central position preferably to one end of the motor frame, being provided centrally with a stud 4 preferably positioned in longitudinal alignment with the armature shaft 5. This stud passes through an opening intermediate the ends of a bar 6 of comparatively rigid material such as metal, fibre, wood or the like, and is secured in position to the bar by a nut or equivalent securing means. Straps 7 of flexible material, preferably leather are secured at their opposite ends to the adjacent inner surfaces of the stringers being looped downwardly to provide cradles 8 for attachment of the opposite ends of the bar 6. The bar 6 preferably engages the cradles at or near the central depending portion thereof so the motor is suspended in central position and the weight thereof is transmitted equally through opposite sides of each cradle support to the respective stringers. The bar is preferably secured to the cradles, bolts 9 being shown for this purpose.

The motor is provided with a grooved driving pulley 10 at the lower end of the armature shaft adapted to receive a driving belt for transmitting movement to the various driven elements of the piano. For keeping the belt properly tensioned, as well as for preventing rotation of the motor about its suspending stud 4, a spring 11 is secured near one side of the motor frame, being suitably anchored at its opposite end and tensioned in opposition to strain of the belt. As will be obvious this arrangement prevents rotation of the motor about its axis of suspension when torque is being transmitted.

The motor suspension herein described has been found in actual test to render the motor practically noiseless in operation, a particularly desirable feature in connection with musical instruments of all kinds. It will be obvious that this type of suspension is not limited to use in player pianos but may be advantageously utilized in other relations, such, for example, as driving mechanism of sound producing instruments.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is—

1. In a motor suspension, a yielding support, an electric motor, and means for connecting said motor to said yielding support at a point substantially in line with the axis of the motor shaft.

2. In a motor suspension, a yielding overhead support, an electric motor arranged below said support, and means for connecting one end of the motor to said support at a point substantially in line with the axis of the motor shaft.

3. In a motor suspension, a yielding support, an electric motor, means for connecting said motor to said yielding support at a point substantially in line with the axis of the motor shaft, and a yielding means connected to the motor at a point remote from the support and exercising a lateral strain thereon.

In testimony whereof I affix my signature, in the presence of two witnesses.

FRANK C. WHITE.

Witnesses:
D. L. FITSPATRICK.
T. B. SCHARMER.